United States Patent
Speaker et al.

(10) Patent No.: US 11,555,627 B2
(45) Date of Patent: Jan. 17, 2023

(54) COMPRESSOR CAPACITY STAGE PROFILE SYSTEMS AND METHODS FOR MULTI-COMPRESSOR CIRCUITS EACH OF WHICH HAVING MULTIPLE COMPRESSORS

(71) Applicant: EMERSON CLIMATE TECHNOLOGIES, INC., Sidney, OH (US)

(72) Inventors: Richard Evans Speaker, Beavercreek, OH (US); Chetan Avinash Sowani, Pune (IN); Kamalakkannan Muthusubramanian, New Delhi (IN); Tanmay Hemant Deshpande, Nashik (IN)

(73) Assignee: Emerson Climate Technologies, Inc., Sidney, OH (US)

( * ) Notice: Subject to any disclaimer, the term of this patent is extended or adjusted under 35 U.S.C. 154(b) by 113 days.

(21) Appl. No.: 16/630,366

(22) PCT Filed: Jul. 12, 2018

(86) PCT No.: PCT/IB2018/055143
§ 371 (c)(1),
(2) Date: Jan. 10, 2020

(87) PCT Pub. No.: WO2019/012466
PCT Pub. Date: Jan. 17, 2019

(65) Prior Publication Data
US 2020/0166237 A1 May 28, 2020

(30) Foreign Application Priority Data

Jul. 12, 2017 (IN) .............................. 201721024656

(51) Int. Cl.
*F24F 11/86* (2018.01)
*F24F 11/65* (2018.01)
(Continued)

(52) U.S. Cl.
CPC .............. *F24F 11/86* (2018.01); *F24F 11/65* (2018.01); *F25B 49/022* (2013.01); *F24F 2140/50* (2018.01); *F24F 2140/60* (2018.01)

(58) Field of Classification Search
CPC ........ F24F 11/86; F24F 11/65; F24F 2140/60; F24F 2140/50; F25B 49/022
See application file for complete search history.

(56) References Cited

U.S. PATENT DOCUMENTS

| | | | | |
|---|---|---|---|---|
| 5,195,329 A | * | 3/1993 | Lewis | ................... F25B 49/022 62/117 |
| 2003/0230097 A1 | * | 12/2003 | Moon | ................... F25B 49/022 62/175 |

(Continued)

OTHER PUBLICATIONS

International Search Report and Written Opinion issued in PCT/IB2018/055143, dated Dec. 26, 2018; ISA/US.

*Primary Examiner* — Larry L Furdge
(74) *Attorney, Agent, or Firm* — Harness, Dickey & Pierce, P.L.C.

(57) ABSTRACT

A system is provided and includes a first controller, a non-transitory computer-readable medium and a second controller. The first controller is configured to control operation of at least one compressor circuit including one or more compressors. The non-transitory computer-readable medium is configured to store instructions of a stage profiler for execution by the controller. The instructions include: determining a target system capacity profile for the at least one compressor circuit; determining system stage capacities for stages of the at least one compressor circuit; selecting some of the system stage capacities based on the target system (Continued)

capacity profile to provide an available system capacity profile; generating modulation information based on the available system capacity profile and a load request signal; and controlling operation of the one or more compressors based on the modulation information and according to the available system capacity profile.

37 Claims, 9 Drawing Sheets

(51) Int. Cl.
  *F25B 49/02* (2006.01)
  *F24F 140/60* (2018.01)
  *F24F 140/50* (2018.01)

(56) References Cited

U.S. PATENT DOCUMENTS

| | | |
|---|---|---|
| 2003/0230099 A1* | 12/2003 | Moon .................. F25B 1/10 |
| | | 62/175 |
| 2004/0261429 A1 | 12/2004 | Dobmeier et al. |
| 2005/0210901 A1* | 9/2005 | Nash .................. F25B 49/022 |
| | | 62/228.5 |
| 2005/0223724 A1 | 10/2005 | Crane et al. |
| 2008/0289349 A1 | 11/2008 | Landers et al. |
| 2009/0205360 A1 | 8/2009 | Haley et al. |
| 2015/0007595 A1 | 1/2015 | Karkhanis et al. |

* cited by examiner

COMPRESSOR CAPACITY STAGE PROFILE SYSTEMS AND METHODS FOR MULTI-COMPRESSOR CIRCUITS EACH OF WHICH HAVING MULTIPLE COMPRESSORS

CROSS-REFERENCE TO RELATED APPLICATIONS

This application is the U.S. National Phase Application under 35 U.S.C. 371 of International Application No. PCT/IB2018/055143 filed on Jul. 12, 2018, which claims the benefit of India Patent Application No. 201721024656, filed on Jul. 12, 2017 and titled "Compressor Capacity Stage Profile Systems and Methods for Multi-compressor Circuits Each of Which Having Multiple Compressors". The entire disclosures of the applications referenced above are incorporated herein by reference.

FIELD

The present disclosure relates to heating, ventilating, and air conditioning (HVAC) systems, and more particularly to systems for controlling modulation of compressors.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Compressors are used in a wide variety of industrial, commercial and residential applications including, but not limited to, heating, ventilating, and air conditioning (HVAC) systems. Electric motors are used to power and/or actuate elements of the compressors. A control system for controlling operation of an electric motor of a compressor can include a drive. The drive can include: a charging circuit, a power factor correction (PFC) circuit; filters, such as an electromagnetic interference (EMI) filter and a direct current filter; an inverter power circuit; a processor; and other circuit components.

An HVAC system may include multiple compressor circuits, where each of the compressor circuits includes multiple compressors. As an example, a first compressor circuit may include a tandem arrangement of two compressors. A second compressor circuit may include three compressors (referred to as a "Trio"). The compressors in the first compressor circuit are connected in parallel. The compressors of the second compressor circuit are connected in parallel. The first compressor circuit may be connected in series or parallel with the second compressor circuit.

Each of the compressors of the HVAC system may be (i) a fixed capacity (or single stage) compressor, (ii) a dual-capacity (or dual-stage) compressor, or (iii) a multi-capacity (or variable) speed compressor. (iv) a multi-capacity digital compressor. The capacity of a compressor refers to an amount of load that the compressor is able to handle for a particular stage. For a single stage compressor, the rated capacity is a maximum load that the compressor is able to handle. An HVAC system may receive or generate a load request signal (sometimes referred to as a "demand input"), which denotes a cooling need for an area being cooled by the HVAC system. The HVAC system selects a stage of operation based on the load requested. In a parallel arrangement, total system capacity of the above-described HVAC systems is equal to a sum of individual compressor capacities. The stage of operation that provides the total system capacity is selected when the demanded input is at a maximum.

The arrangement of compressors of an HVAC system provides a scope for compressor modulation to achieve energy efficiency. Compressor modulation refers to a selected stage of operation of a compressor and/or frequency of a voltage signal provided to a motor of a compressor. As the frequency of a voltage signal supplied to a variable speed compressor increases, the capacity of the variable speed compressor increases.

SUMMARY

A system is provided and includes a first controller, a non-transitory computer-readable medium and a second controller. The first controller is configured to control operation of at least one compressor circuit including one or more compressors. The non-transitory computer-readable medium is configured to store instructions of a stage profiler for execution by the controller. The instructions include: determining a target system capacity profile for the at least one compressor circuit; determining system stage capacities for stages of the at least one compressor circuit; selecting some of the system stage capacities based on the target system capacity profile to provide an available system capacity profile; generating modulation information based on the available system capacity profile and a load request signal; and controlling operation of the one or more compressors based on the modulation information and according to the available system capacity profile.

In other features, a system is provided and includes at least one compressor circuit, a first controller, a stage profiler, and a second controller. The at least one compressor circuit includes one or more compressors. The first controller is configured to receive configuration inputs from a user interface. The stage profiler is configured to: determine a target system capacity profile for the at least one compressor circuit based on the configuration inputs; determine system stage capacities for stages of the at least one compressor circuit based on the configuration inputs; select some of the system stage capacities based on the target system capacity profile to provide an available system capacity profile; and generate modulation information based on the available system capacity profile and a load request signal. The second controller is configured to, based on the modulation information, control operation of the one or more compressors.

In other features, a method of operating at least one compressor circuit is provided. The at least one compressor circuit includes one or more compressors. The method includes: determining a target system capacity profile for the at least one compressor circuit; determining system stage capacities for stages of the at least one compressor circuit; selecting some of the system stage capacities based on the target system capacity profile to provide an available system capacity profile; generating modulation information based on the available system capacity profile and a load request signal; and based on the modulation information, controlling the one or more compressors according to the available system capacity profile.

In other features, a system is provided and includes a controller and a non-transitory computer-readable medium. The controller is configured to control operation of compressor circuits including first compressors and second compressors. The compressor circuits include (i) a first compressor circuit including the first compressors, and (ii) a second compressor circuit including the second compressors. The non-transitory computer-readable medium is configured to store instructions of a stage profiler for execution by the controller. The instructions include: determining a target system capacity profile for the compressor circuits; determining system stage capacities for stages of the compressor circuits; selecting some of the system stage capacities based on the target system capacity profile to provide an available system capacity profile; generating modulation information based on the available system capacity profile and a load request signal; and transmitting the modulation information to a compressor drive to drive the first compressors and the second compressors according to the available system capacity profile.

In other features, a system is provided and includes compressor circuits, a controller, a stage profiler, and a compressor drive. The compressor circuits include a first compressor circuit and a second compressor circuit, where the first compressor circuit includes first compressors, and where the second compressor circuit includes second compressors. The controller is configured to receive configuration inputs from a user interface. The stage profiler is configured to: determine a target system capacity profile for the compressor circuits based on the configuration inputs; determine system stage capacities for stages of the compressor circuits based on the configuration inputs; select some of the system stage capacities based on the target system capacity profile to provide an available system capacity profile; and generate modulation information based on the available system capacity profile and a load request signal. The compressor drive is configured to, based on the modulation information, drive the first compressors and the second compressors.

In other features, a method of operating compressor circuits is provided. The compressor circuits include (i) a first compressor circuit including first compressors, and (ii) a second compressor circuit including second compressors. The method includes: determining a target system capacity profile for the compressor circuits; determining system stage capacities for stages of the compressor circuits; selecting some of the system stage capacities based on the target system capacity profile to provide an available system capacity profile; generating modulation information based on the available system capacity profile and a load request signal; and based on the modulation information, driving the first compressors and the second compressors according to the available system capacity profile.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

A traditional HVAC system may include multiple compressor circuits, where each of the compressor circuits includes multiple compressors. The HVAC system has a predetermined capacity stage profile and corresponding algorithm for selecting stages of the capacity stage profile. The stages are selected based on the demanded load. The capacity stage profile may include a graph or table providing the capacities of the possible operating stages. Each stage refers to operation of one or more compressors at one or more predetermined operating speeds.

Figure 1:
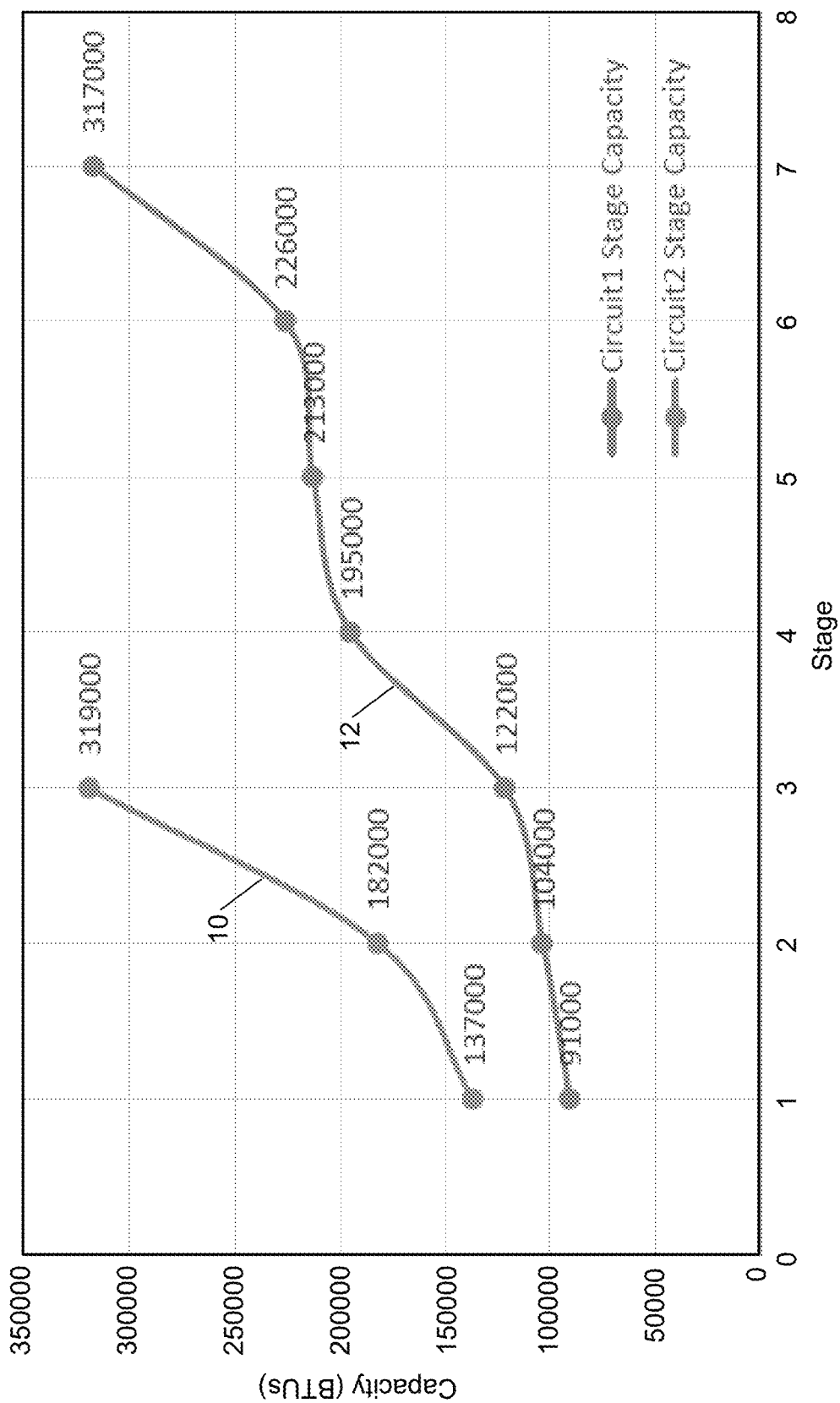
FIG. 1 shows an example plot of capacities of compressors of a tandem circuit and a Trio circuit.

As a first example, FIG. 1 shows an example plot of compressor capacities of the compressors of a tandem circuit and a Trio circuit. The tandem circuit may include two fixed capacity compressors having capacities 137,000 British thermal units (BTUs) and 182,000 BTUs, respectively. The Trio circuit may include three fixed capacity compressors having capacities 91,000 BTUs, 104,000 BTUs, and 122,000 BTUs, respectively. A first curve 10 represents the capacities of the tandem circuit. A second curve 12 represents the capacities of the Trio circuit. The points on the curves correspond to example possible capacities for the stages of the compressors, where each point corresponds to a capacity of a particular compressor or a sum of capacities for two or three compressors.

Figure 2:
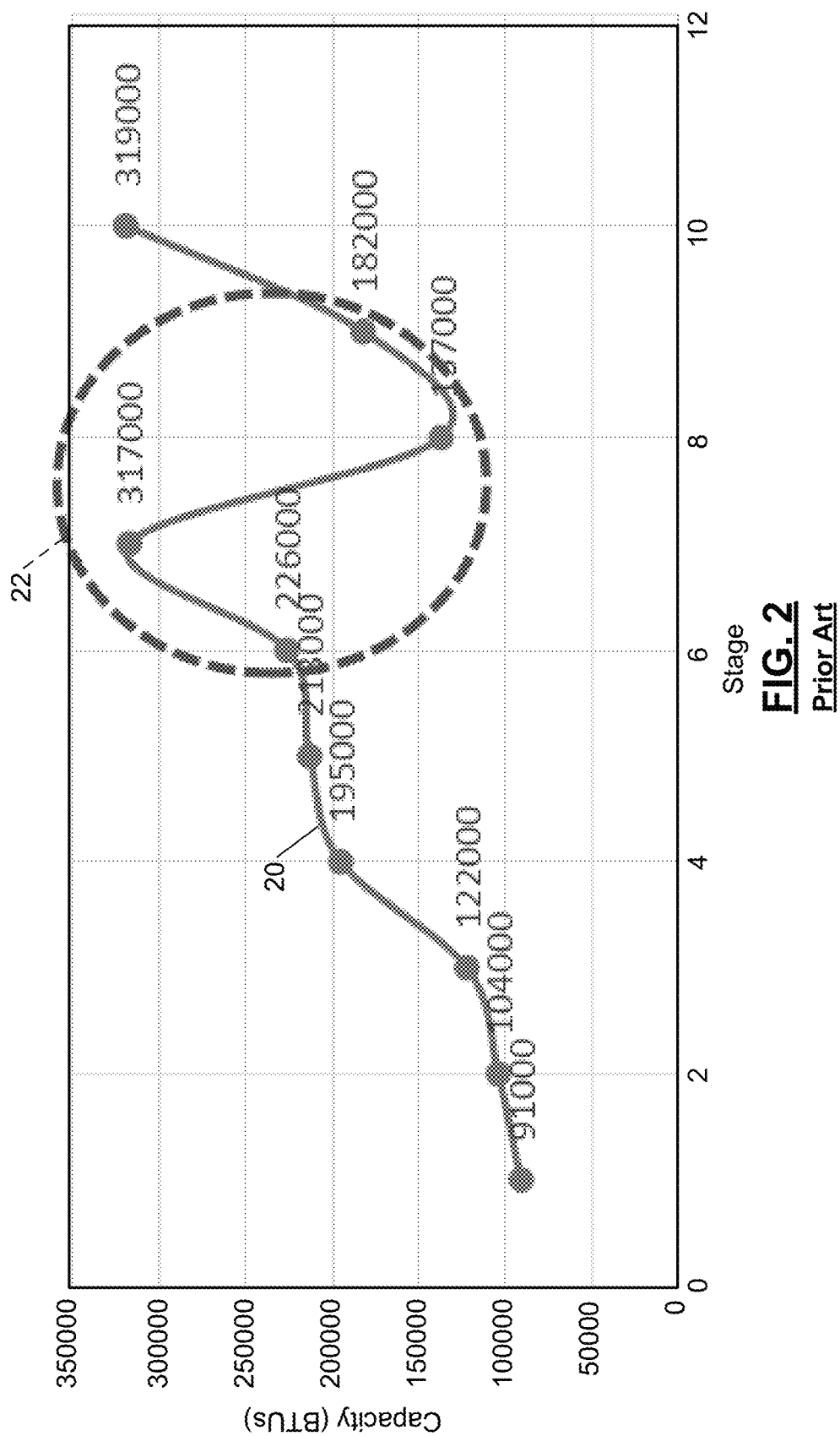
FIG. 2 shows an example plot of compressor capacities for a serial arrangement of the tandem circuit and the Trio circuit.

As another example, FIG. 2 shows an example plot 20 of compressor capacities for a serial arrangement of the tandem circuit (circuit 1) and the Trio circuit (circuit 2). Circuit 1 is operated during a lower half and/or first portion of an available capacity range. Circuit 1 and circuit 2 are operating during a second half and/or second portion of the available capacity range. Circuit 2 is activated after circuit 1 is at a full (or maximum) capacity. Combined stage capacity for circuit 1 and circuit 2 produces a non-linear system capacity profile due to the serial arrangement of the compressor circuits. The non-linearity is shown within a circled region 22. In general, HVAC operation is less energy efficient when using a non-linear system capacity profile, than when using a linear system capacity profile. The non-linearity of the system capacity profile can result in a sudden drop in system capacity when an increase in demanded capacity exists. This can result in an uncalled for decrease in temperature and discomfort of a user/occupant.

Figure 3:
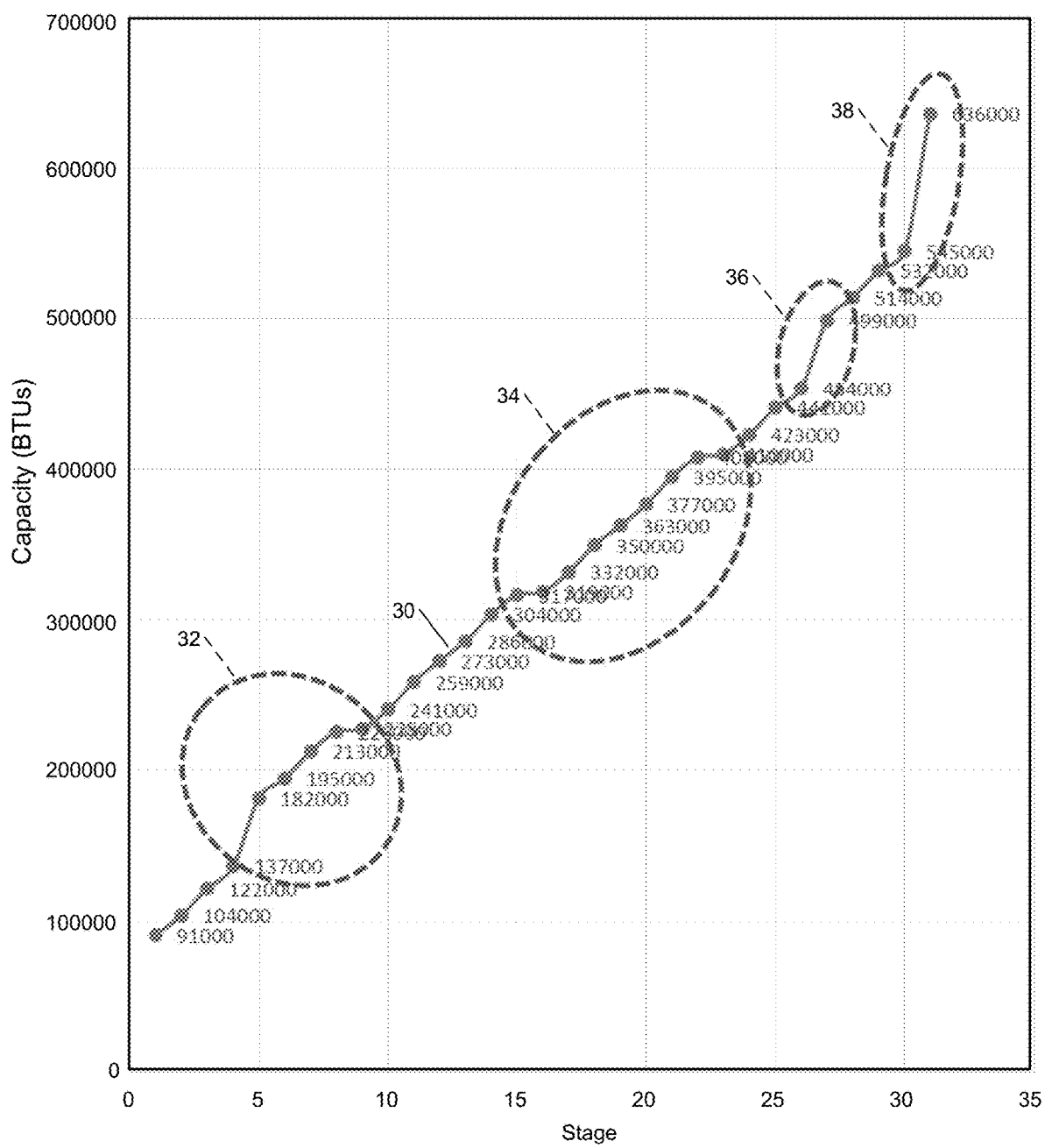
FIG. 3 shows an example plot of compressor capacities for a parallel arrangement of the tandem circuit and the Trio circuit.

As yet another example, FIG. 3 shows an example plot of compressor capacities for a parallel arrangement of circuit 1 and circuit 2. The combined stage capacity for circuit 1 and circuit 2 produces a profile that is more linear than the serial arrangement, but includes non-linear regions 32, 34, 36, 38 and thus is non-linear. The profile has different slopes of system capacity for different ranges of stages. This profile can result in sudden increases in capacity, which can cause sudden increases in cooling and discomfort for a user/occupant. This profile results in more energy usage than a linear profile.

The examples set forth herein include a customizable stage profiling modulation algorithm for generating capacity stage profiles for HVAC systems having different arrangements of compressors circuits and different types of compressors. This is unlike traditional modulation algorithms, which are specific to a particular compressor arrangement and predetermined specific types of compressors. If a compressor is changed and has different capacities and/or is of a different type, then a different modulation algorithm is needed and the previous modulation algorithm is no longer applicable. The disclosed modulation algorithm is not specific to a particular arrangement of compressors and/or a particular set of compressor types. Each of the HVAC systems on which disclosed customizable algorithm is implemented may include two or more circuits of compressors. Each of the circuits may include one or more compressors. The compressors may be of different types. Some examples types of compressors are fixed capacity compressors, dual-capacity compressors, and variable capacity compressors. The variable capacity compressors may be digital or variable speed compressors. The compressor circuits may be connected in parallel. The compressors in each of the circuits may also be connected in parallel. In an embodiment, the disclosed modulation algorithm provides a linear profile of capacities.

Figure 4:
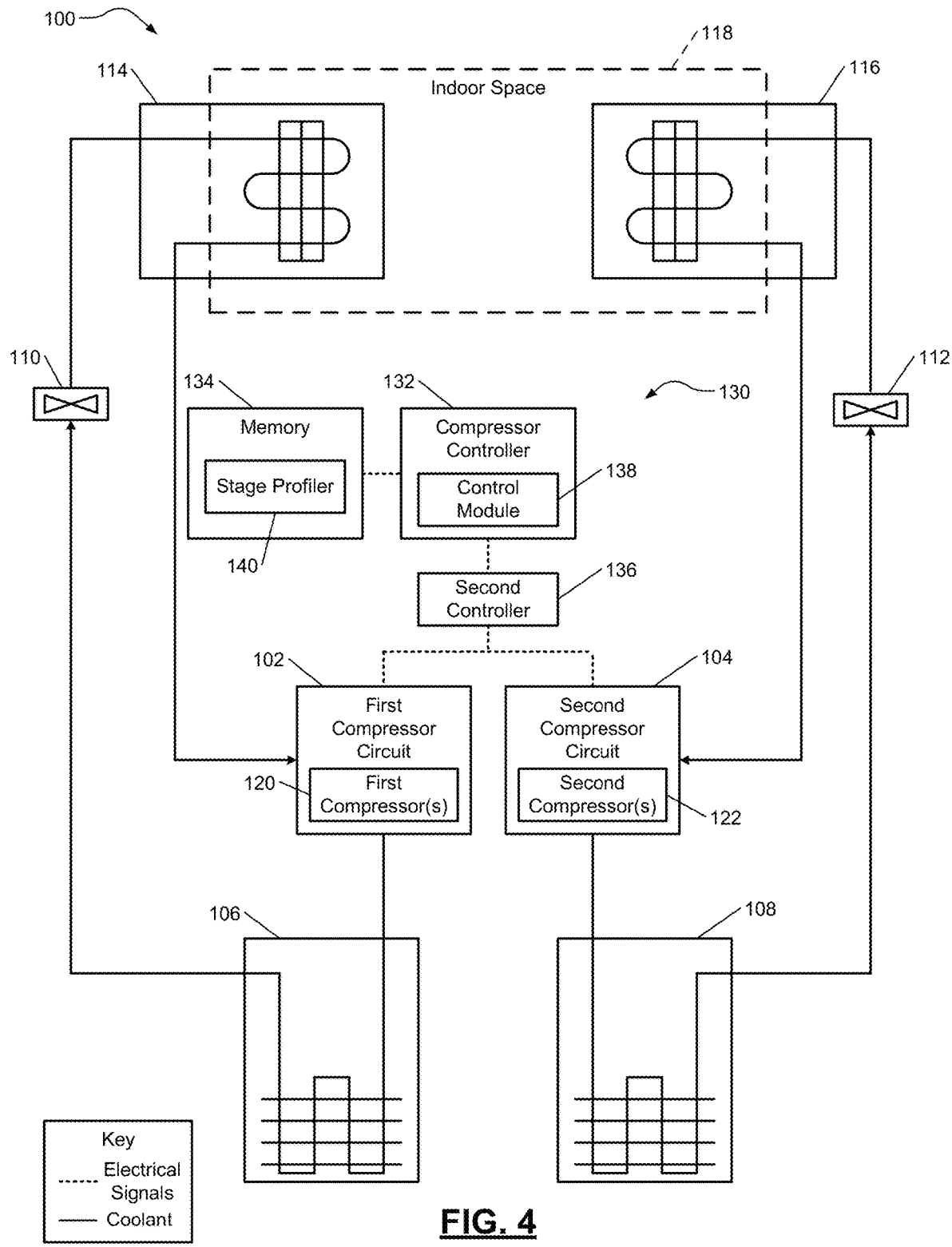
FIG. 4 is a functional block diagram of an example HVAC system including a compressor controller, control module, a stage profiler, and compressor drive in accordance with an embodiment of the present disclosure.

FIG. 4 shows an example HVAC system 100 that includes compressor circuits 102, 104, followed by condensers 106, 108, expansion valves 110, 112 and evaporators 114, 116. Although multiple compressor circuits are shown each of which including multiple compressors, the examples disclosed herein are applicable to a single compressor circuit including one or more compressors. Although an HVAC system is shown, the examples disclosed herein are applicable to refrigeration systems including multiple compressor circuits. Outputs of the evaporators 114, 116 are provided to the compressor circuits 102, 104. The evaporators 114, 116 may be located in an indoor space 118, which may be a space within a commercial or residential building. The first compressor circuit 102 includes first compressors 120. The second compressor circuit includes second compressors 122. Although two HVAC circuits are shown having respective compressor circuits, condensers, expansion valves, and evaporators, additional HVAC circuits may be included. Each of the compressor circuits 102, 104 may include one or more compressors. Each of the compressors may be a fixed capacity compressor, a dual-capacity compressor, a variable speed compressor, or a digital compressor. If a compressor is a variable speed or a digital compressor, the compressor may have an infinite number of possible stages. The number of stages of the variable speed compressor may be limited to a predetermined number of stages (e.g., 10 stages) by a control system 130. For example, a maximum capacity of the variable speed compressor may be divided by the predetermined number of stages to provide equally spaced steps having respective capacities for each of the predetermined number of stages. Similarly for a digital compressor, the compressor may have an infinite number of possible stages. The number of stages of a digital compressor may be limited to a predetermined number of stages (e.g., 10 stages) by a control system 130.

The HVAC system 100 includes the control system 130. The control system 130 includes a compressor controller (or first controller) 132, a memory 134, and a second controller 136, which may be implemented as a compressor drive depending on the types of compressors included in the compressor circuits 102, 104. Although the second controller 136 is primarily referred to below as a compressor drive, the second controller 136 may be used to control operations of the one or more compressors in the corresponding one or more compressor circuits. In one embodiment, the controllers 132, 136 are implemented as a single controller. The compressor controller 132 includes a control module 138. In an embodiment, the memory 134 stores a stage profiler 140. The compressor controller 132 and/or the control module 138 may execute the stage profiler 140. The stage profiler 140 may be stored in the compressor controller 132. In another embodiment, the control module 138 and/or the stage profiler 140 are implemented as firmware and/or hardware. In an embodiment, the stage profiler 140 is implemented as a module. The control module 138 generates compressor modulation information based on the stage profiler 140. The compressor drive 136 controls operation of the compressors 120, 122 based on the compressor modulation information. As an example, the compressor modulation information may include compressor identifiers (IDs), activation times for the compressors, stage IDs for each compressor activated, compressor frequencies, etc. The stage IDs identify the stages (or capacities) at which to operate the corresponding compressors. Operations of the compressor controller 132, the compressor drive 136, the control module 138, and the stage profiler 140 are further described below with respect to FIGS. 5-9.

Figure 5:
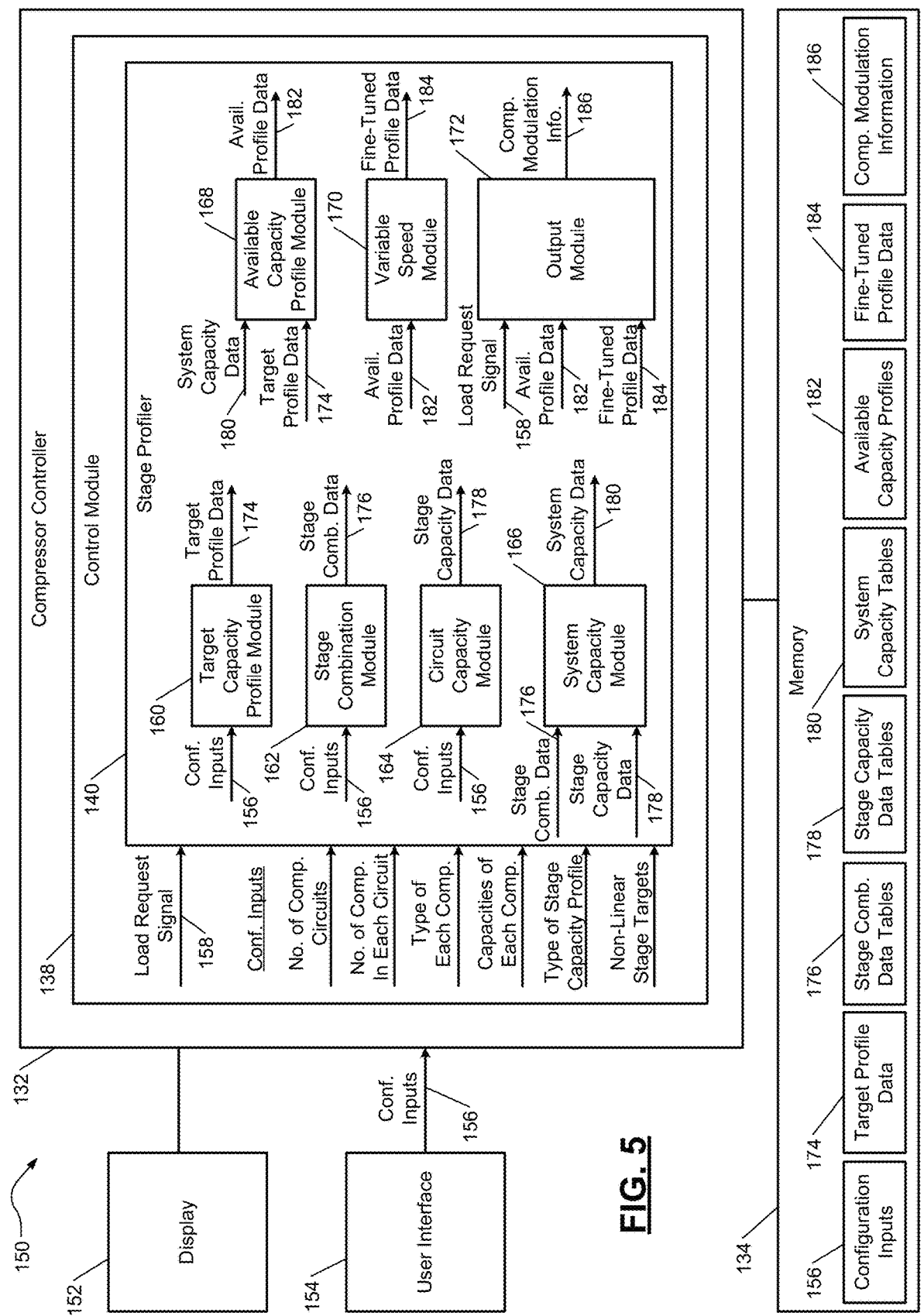
FIG. 5 is a functional block diagram of an example of a portion of the HVAC system including the compressor controller of FIG. 4.

FIG. 5 shows an example of a portion 150 of the HVAC system 100 of FIG. 1. The portion 150 includes the compressor controller 132, the memory 134, the control module 138, the stage profiler 140, a display 152 and a user interface 154. The stage profiler 140 is shown as being part of and/or stored in the control module 138. The user interface 154 may include a keyboard, a touchpad, a mouse, a touch screen, a wireless communication transceiver, and/or other user interface devices. Configuration inputs 156 may be received at the user interface 154 and provided to the compressor controller 132, which may store the configuration inputs 156 in the memory 134. Some examples of the configuration inputs 156 are: number of compressor circuits in a HVAC system; a number of compressors in each of the compressor circuits; a type of each of the compressors in each of the compressor circuits; capacities of stages of each of the compressors; a type of stage capacity profile (e.g., linear or non-linear); and target capacities for stages of a target system capacity profile. Capacities of stages of a non-linear capacity profile may be provided if the type of stage capacity profile selected is non-linear. Although capacities of stages of a linear capacity profile may be provided, in one embodiment if the type of stage capacity profile is linear, then no capacities may be provided as one of the configuration inputs 156, since the capacities for a linear profile may be determined by the below described methods. The configuration inputs may be shown to a user on the display 152.

The configuration inputs 156 and a load request signal 158 may be provided to the stage profiler 140. The load request signal 158 may be provided as an input via the user interface 154 or may be generated by the control module 138 based on, for example, a signal received from a thermostat or other temperature control device. The stage profiler 140 may include a target capacity profile module 160, a stage combination module 162, a circuit capacity module 164, a system capacity module 166, an available capacity profile module 168, a variable speed module 170 and an output module 172. In an embodiment, the modules 160, 162, 164, 166, 168, 170 and 172 are sets of code and respectively generate target profile data 174, stage combination data 176, stage capacity data 178, system capacity data 180, available profile data 182, fine-tuned profile data 184, and compressor modulation information 186, which may be stored in the memory 134. This data and information along with operations of the modules 160, 162, 164, 166, 168, 170 and 172 are further described below with respect to the methods of FIGS. 6 and 9.

Figure 6:
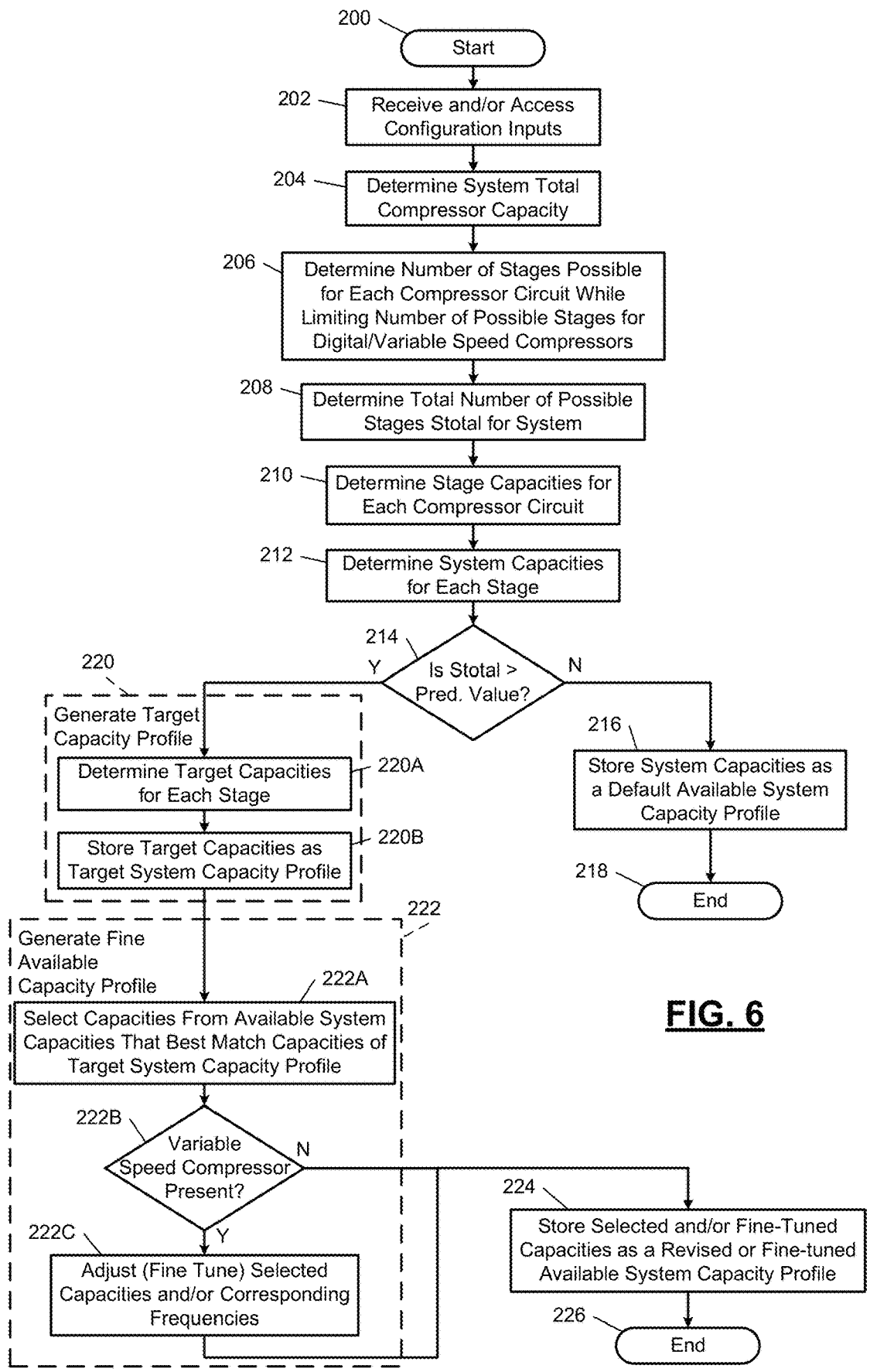
FIG. 6 is a flow diagram illustrating an example method for generating target and available capacity stage profiles in accordance with an embodiment of the present disclosure.
Figure 9:
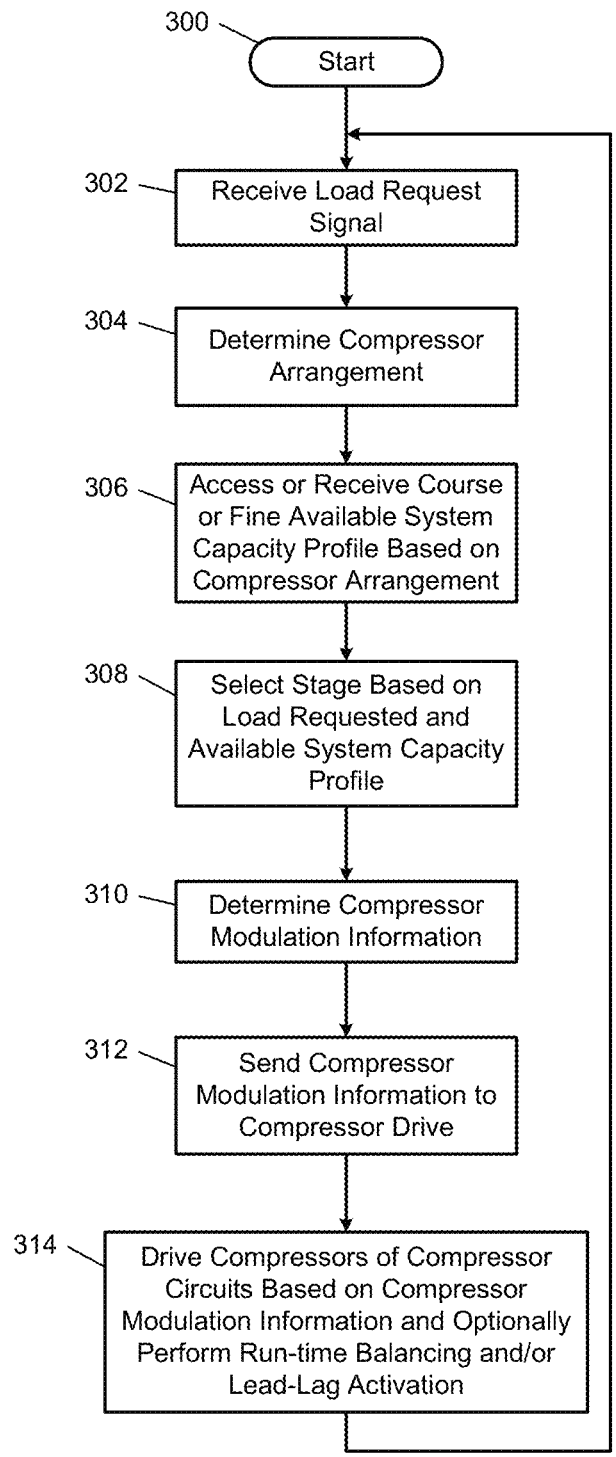
FIG. 9 is a flow diagram illustrating an example method for operating an HVAC system in accordance with an embodiment of the present disclosure.

For further defined structure of the modules of FIGS. 4-5 see below provided methods of FIGS. 6 and 9 and below provided definition for the term "module". The systems disclosed herein may be operated using numerous methods, example methods are illustrated in FIGS. 6 and 9. FIG. 6 shows a flow diagram illustrating an example method for generating target and available capacity stage profiles. The method may be referred to as the customizable stage profiling modulation algorithm that qualifies capacities of operating stages of compressors of compressors circuits of an HVAC system over a target system capacity profile. Although the following methods are shown as separate methods, the methods and/or operations from separate methods may be combined and performed as a single method. Although the methods are primarily described for multiple compressor circuits each of which including multiple compressors, the methods are applicable to one or more compressor circuits each of which having one or more compressors. Also, although the following operations are primarily described with respect to the implementations of FIGS. 4-5, the operations may be easily modified to apply to other implementations of the present disclosure. The operations may be iteratively performed. This is especially true if a compressor arrangement and/or a compressor is changed.

The method may begin at 200. At 202, some or all of the configuration inputs 156 are received and/or accessed by the stage profiler 140. Certain ones of the configuration inputs are utilized by the target capacity profile module 160, the stage combination module 162, and the circuit capacity module 164.

At 204, the target capacity profile module 160 determines a system total compressor capacity Ctotal, which is a sum of the maximum capacities of each of the compressors of the compressor circuits. For example, Ctotal may be equal to C1+C2+C3+, . . . , Cn, where C1, C2, C3, . . . , Cn are maximum capacities of each of the compressors, and n is the total number of compressors.

At 206, the stage combination module 162 determines a number of stages possible for each of the compressor circuits while limiting a number of possible stages for variable speed compressors, and digital compressors as described above. Tables 1-2 provide examples of possible stages for a tandem compressor circuit and a Trio compressor circuit. In the tables, F indicates that the compressor is a fixed capacity (or single stage) compressor, U indicates that the compressor is a dual capacity (or dual stage) compressor, D indicates that the compressor is a digital compressor. In this example, the number of stages of the digital compressor is limited to 10 stages.

TABLE 1

Combinations of Tandem Compressor Circuit

| System Conf. No. | Circuit 1 | Circuit 1 Possible No. of Stages | Circuit 2 | Circuit 2 Possible No. of Stages | Combined Total No. of Stages |
|---|---|---|---|---|---|
| 1 | F F | 3 | F F | 3 | 15 |
| 2 | F D | 21 | F D | 21 | 483 |
| 3 | F D | 21 | F F | 3 | 87 |
| 4 | F D | 21 | F U | 5 | 131 |
| 5 | F U | 5 | F U | 5 | 35 |
| 6 | F U | 5 | F F | 3 | 23 |
| 7 | U U | 8 | F F | 3 | 35 |
| 8 | U U | 8 | F D | 21 | 197 |
| 9 | U U | 8 | F U | 5 | 53 |
| 10 | U U | 8 | U U | 8 | 80 |

TABLE 2

Combinations of Trio Compressor Circuit

| System Conf. No. | Circuit 1 | Circuit 1 Possible No. of Stages | Circuit 2 | Circuit 2 Possible No. of Stages | Combined Total No. of Stages |
|---|---|---|---|---|---|
| 1 | F F F | 7 | F F F | 7 | 63 |
| 2 | F F U | 11 | F F U | 11 | 143 |
| 3 | F F U | 11 | F F F | 7 | 95 |
| 4 | F U U | 17 | F U U | 17 | 323 |
| 5 | F U U | 17 | F F F | 7 | 143 |
| 6 | F U U | 17 | F F U | 11 | 215 |

At 208, the stage combination module 162 determines a total number of possible stages Stotal for the corresponding HVAC system (e.g., the HVAC system 100). The total number of possible stages may be stored as the stage combination data 176 in the memory 134. Table 3 provides examples of the total number of possible stages Stotal for a HVAC system including the tandem compressor circuit and the trio compressor circuit.

TABLE 3

Combinations of Tandem-Trio Compressor Circuits

| System Conf. No. | Circuit 1 | Circuit 1 Possible No. of Stages (S1) | Circuit 2 | Circuit 2 Possible No. of Stages (S2) | Combined Possible No. of Stages (Stotal) |
|---|---|---|---|---|---|
| 1 | F F F | 7 | F F | 3 | 31 |
| 2 | F F U | 11 | F F | 3 | 47 |
| 3 | F U U | 17 | F F | 3 | 71 |
| 4 | F F F | 7 | F D | 21 | 175 |
| 5 | F F U | 11 | F D | 21 | 263 |
| 6 | F U U | 17 | F D | 21 | 395 |
| 7 | F F F | 7 | F U | 5 | 47 |
| 8 | F F U | 11 | F U | 5 | 71 |
| 9 | F U U | 17 | F U | 5 | 107 |
| 10 | F F F | 7 | U U | 8 | 71 |
| 11 | F F U | 11 | U U | 8 | 107 |
| 12 | F U U | 17 | U U | 8 | 161 |

For table 3, the combined possible number of stages Stotal may be determined using equation 1, where S1 is the number of possible stages for the first compressor circuit and S2 is the number of possible stages for the second compressor circuit. As a result, the maximum number of system stages is finite.

$S_{total} = S1 + S2 + (S1*S2)$ (1)

At 210, the circuit capacity module 164 determines stage capacities for each compressor circuit. The stage capacities may be stored as the stage capacity data 178 in the memory 134. Tables 4-5 provide stage capacities respectively for the two example compressor circuits of the compressor arrangement of the first system configuration of Table 3. Other tables may be provided for the other system configurations of Table 3 and/or other compressor circuit arrangements. In this example, each of the compressors of each of the two compressor circuits is a fixed capacity compressor. Although tables 4-5 provide example capacity values for the respective compressors, the HVAC system may have (i) different compressors, and/or (ii) compressors with other capacities and/or a different number of stages.

TABLE 4

Stages of First Compressor Circuit

| System Conf. No. | C1 | B1 | A1 | Comp. Stage Comb. | Combination Capacity | Circuit Possible No. of Stages |
|---|---|---|---|---|---|---|
| 1 | F3 | F2 | F1 | F1 | FCAP1 | 7 |
| Capacity | FCAP3 | FCAP2 | FCAP1 | F2 | FCAP2 | |
| Capacity (BTU) | 91000 | 104000 | 122000 | F3 | FCAP3 | |
| | | | | F1 + F2 | FCAP1 + FCAP2 | |
| | | | | F1 + F3 | FCAP1 + FCAP3 | |
| | | | | F2 + F3 | FCAP2 + FCAP3 | |
| | | | | F1 + F2 + F3 | FCAP1 + FCAP2 + FCAP3 | |

TABLE 5

Stages of Second Compressor Circuit

| System Conf. No. | B1 | A1 | Compressor Stage Comb. | Combination Capacity | Circuit Possible No. of Stages |
|---|---|---|---|---|---|
| 2 | F5 | F4 | F4 | FCAP4 | 3 |
| Capacity | FCAP5 | FCAP4 | F5 | FCAP5 | |
| Capacity (BTU) | 182000 | 137000 | F4 + F5 | FCAP4 + FCAP5 | |

At 212, the system capacity module 166 determines system capacities for each stage based on the stage combination data 176 and the stage capacity data 178. The system capacities may be stored as the system capacity data 180 in the memory 134. Table 6 shows an example of the system stage capacities for the above-described example of the first system configuration of FIG. 3, where each of the compressors of the tandem and Trio circuits are a fixed capacity compressor. The system stage capacities are arranged in increasing order of capacity. The system stage capacities may be plotted to provide a profile that may be non-linear. For this example there are 31 possible stages. The compressors of one of the compressors circuits (e.g., the first compressor circuit) do not need to all be active when a compressor of another compressor circuit (e.g., the second compressor circuit) are activated. This is true independent of whether the compressors of the first compressor circuit provide lower capacities than the compressors of the second compressor circuit.

TABLE 6

System Stage Capacities

| Combined Multi-Circuit Stage No. | Multi-Circuit Compressor Stage Combination | System Capacity |
|---|---|---|
| 1 | 91000 | F3 |
| 2 | 104000 | F2 |
| 3 | 122000 | F1 |
| 4 | 137000 | F4 |
| 5 | 182000 | F5 |
| 6 | 195000 | F2 + F3 |
| 7 | 213000 | F1 + F3 |
| 8 | 226000 | F1 + F2 |
| 9 | 228000 | F3 + F4 |

TABLE 6-continued

System Stage Capacities

| Combined Multi-Circuit Stage No. | Multi-Circuit Compressor Stage Combination | System Capacity |
|---|---|---|
| 10 | 241000 | F2 + F4 |
| 11 | 259000 | F1 + F4 |
| 12 | 273000 | F3 + F5 |
| 13 | 286000 | F2 + F5 |
| 14 | 304000 | F1 + F5 |
| 15 | 317000 | F1 + F2 + F3 |
| 16 | 319000 | F4 + F5 |
| 17 | 332000 | F2 + F3 + F4 |
| 18 | 350000 | F1 + F3 + F4 |
| 19 | 363000 | F1 + F2 + F4 |
| 20 | 377000 | F2 + F3 + F5 |
| 21 | 395000 | F1 + F3 + F5 |
| 22 | 408000 | F1 + F2 + F5 |
| 23 | 410000 | F3 + F4 + F5 |
| 24 | 423000 | F2 + F4 + F5 |
| 25 | 441000 | F1 + F4 + F5 |
| 26 | 454000 | F1 + F2 + F3 + F4 |
| 27 | 499000 | F1 + F2 + F3 + F5 |
| 28 | 514000 | F2 + F3 + F4 + F5 |
| 29 | 532000 | F1 + F3 + F4 + F5 |
| 30 | 545000 | F1 + F2 + F4 + F5 |
| 31 | 636000 | F1 + F2 + F3 + F4 + F5 |

At 214, the stage profiler 140 may determine whether the total number of possible stages $S_{total}$ for the HVAC system is greater than a predetermined maximum value (e.g., 20). As the predetermined maximum value increases, the linearity of the resulting system capacity profile improves. However, as the predetermined maximum value increases, the amount of change in linearity decreases. This relationship between the predetermined maximum value and the amount of change in linearity is not linear. When the predetermined maximum value is greater than or equal to a predetermined threshold, the amount of change in linearity is minimal. For this reason, the predetermined maximum value may be set to provide a minimal amount of linearity while limiting a total number of stages. If the total number of possible stages Stotal is not greater than the predetermined value, then operation 216 is performed, otherwise operation 220 is performed. For the first system configuration example of Table 3, the total number of possible stages is 31. If the predetermined maximum value is 20, then the total number of possible stages is greater than the predetermined maximum value and operation 220 is performed.

At 216, the system capacities are stored as a default available system capacity profile based on the target profile data 174 and the system capacity data 180. In one embodiment, the default available system capacity profile is stored as a table and/or a plot of systems capacities versus stages. The table relates the system capacities to respective stages of operation, where each stage includes operating one or more motors of one or more of the compressors at corresponding speeds. The default available system capacity profile provides a basis upon which a modulation strategy can be followed for the compressors of the corresponding compressor arrangement and can be provided to the second controller (or compressor drive) 136, as described with respect to the method of FIG. 9. Subsequent to operation 216, the method may end at 218 as shown or may return to operation 202 if, for example, a change has been made in the compressor arrangement and/or one of the compressors has been changed with a compressor of a different type and/or capacity. Although not shown in FIG. 6, if one or more of the system capacities for one or more stages of the default available system capacity profile are outside a predetermined range from a corresponding one or more capacities of the target system capacity profile, then the one or more systems capacities are identified as outliers. The outliers may be removed as possible system capacities. This may be performed to maximize linearity of the default available system capacity profile.

At 220, the target capacity profile module 160 generates a target system capacity profile. At 220A, the target capacity profile module 160 determines target capacities respectively for a predetermined number of stages (e.g., 20). The target capacity profile module 160 fits a straight line to the system capacity range (i.e. the total or maximum capacity of the system) to provide a target system capacity profile. The target system capacity profile is thus linear. The system capacity range is divided into equally spaced points providing the targeted capacities for the stages of the target system capacity profile. For example, each stage capacity Cs may be equal to a product of Ctotal and the stage number s divided by the predetermined number of stages ST, as represented by equation 2.

$$Cs = (C\text{total} * s)/ST \quad (2)$$

Figure 7:
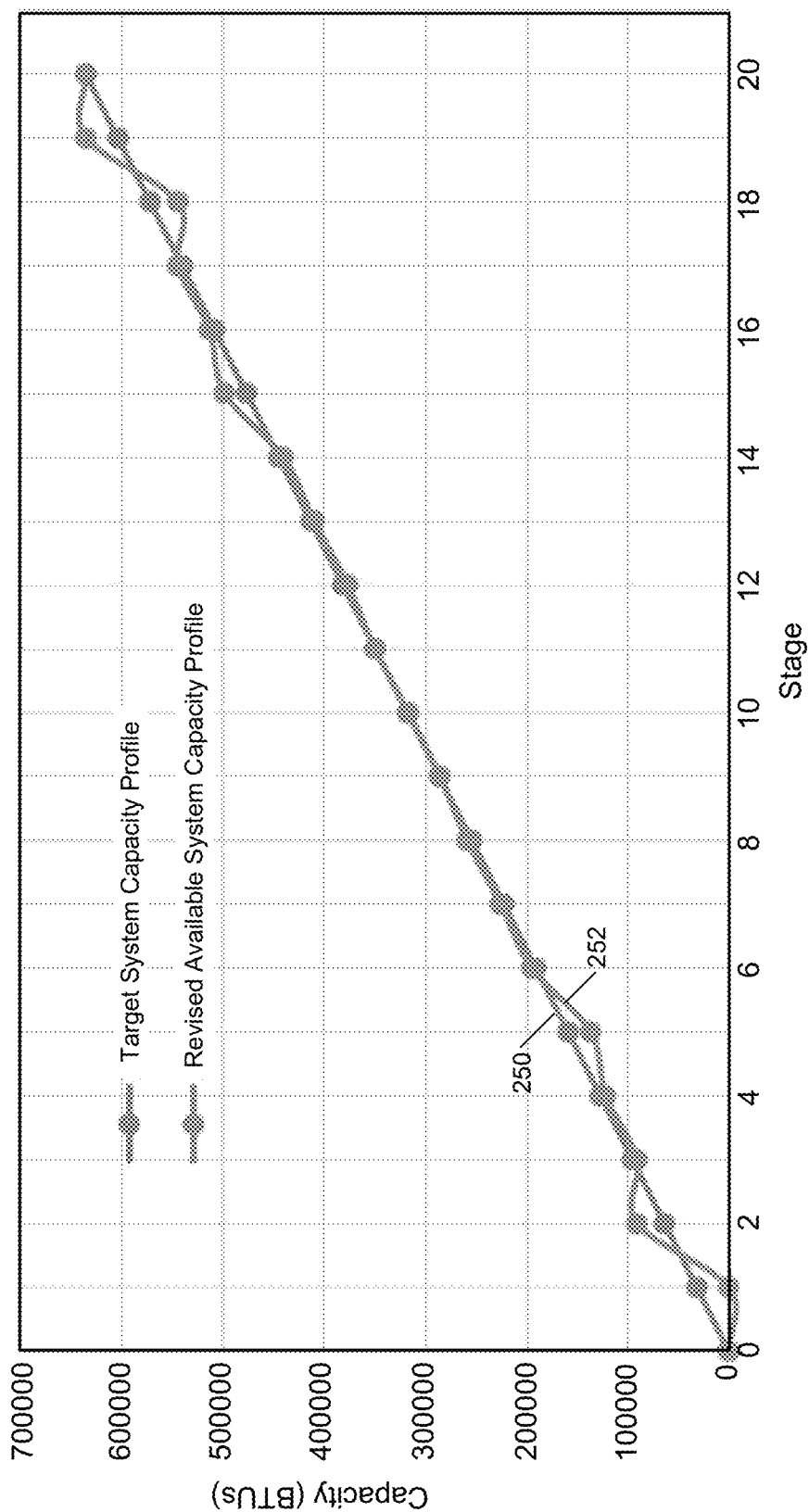
FIG. 7 is an example plot of a target system capacity profile and an available system capacity profile in accordance with an embodiment of the present disclosure.
Figure 8:
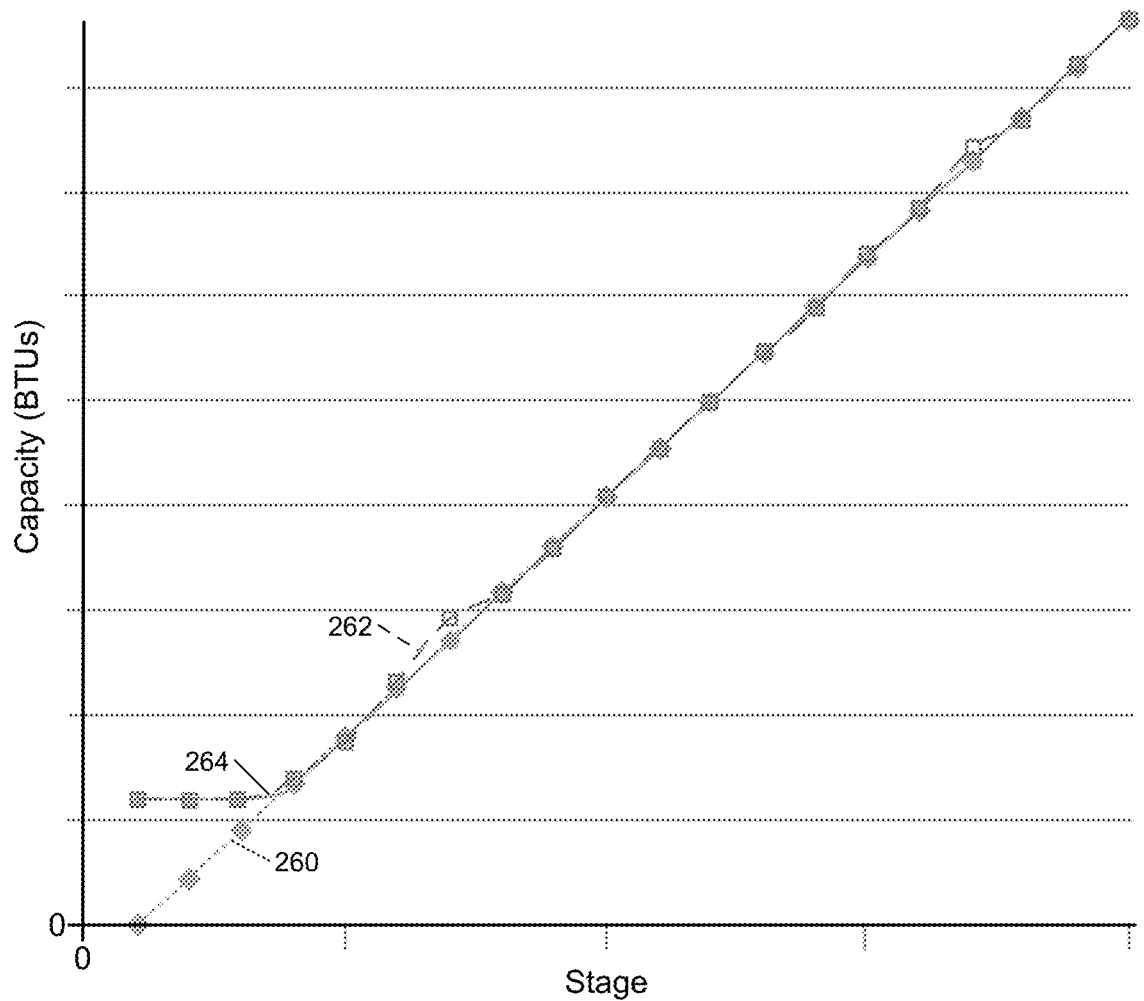
FIG. 8 is an example plot of a target system capacity profile, a revised available system capacity profile, and a fine-tuned available system capacity profile having fine-tuned capacities in accordance with another embodiment of the present disclosure.

The number of equally spaced points is equal to the predetermined number of stages ST. An example target system capacity profile 250 is shown in FIG. 7. Another example target system capacity profile 260 is shown in FIG. 8, where the target system capacity profile 260 is offset to the right of the capacity axis and along the stage axis, such that the target system capacity profile 260 does not start at a first point associated with stage 0, but rather at a second point. The value of the second point is greater than a value of the first point. The example target system capacity profile 260 is for a different compressor arrangement than that of FIG. 7. The compressor arrangement for the example target system capacity profile 260 includes two compressor circuits each having a tandem set of compressors, where the first tandem set includes a variable speed compressor and a fixed capacity compressor and the second tandem set of compressors includes two fixed capacity compressors.

In an embodiment and at 220A, a portion of the target system capacity profile may be non-linear. The configuration inputs 156 may indicate that the available system capacity profile being generated is non-linear and include one or more target system capacities and corresponding stages for the target system capacity profile being generated. The remainder of the target system capacity profile may be linear.

At 220B, the target capacity profile module 160 stores the target capacities of the target system capacity profile as the target profile data 174 in the memory 134. In one embodiment, the target capacities are stored as a table and/or as a plot. The target system capacity profile provides a baseline based on which an available system capacity profile is generated at 224. The available system capacity profile may be linear and/or have a predetermined range of operation that is linear. In an embodiment, the compressors are not operated in one or more non-linear portions of the available system capacity profile.

At 222, the available capacity profile module 168 generates a revised available system capacity profile based on the target profile data 174 and the system capacity data 180. The revised available system capacity profile may include the same or more possible system capacities than the default available system capacity profile. The default available system capacity profile may be referred to as a course profile and be less linear than the revised available system capacity profile, which may be referred to as a fine profile. At 222A, the available capacity profile module 168 selects capacities from the available system capacities determined during operation 212 that best match capacities of the target system capacity profile. Table 7 provides an example of points (or system capacities) that may be selected for the first system configuration example of Table 3, where the predetermined maximum number of stages is 20. For this example, since the minimum available system capacity that is greater than 0 is significantly greater than the target capacity for stage 1, the compressors are maintained in an OFF state while operating according to stage 1.

TABLE 7

Selected System Capacities and Compressor Stage Information

| Max Discrete Stage Nos. | Target Capacity | Selected/ Revised Available Capacity | Compressor Stage Driving Information |
| --- | --- | --- | --- |
| 0 | 0 | 0 | All OFF |
| 1 | 31800 | 0 | All OFF |
| 2 | 63600 | 91000 | F3 |
| 3 | 95400 | 91000 | F3 |
| 4 | 127200 | 122000 | F1 |
| 5 | 159000 | 137000 | F4 |
| 6 | 190800 | 195000 | F2 + F3 |
| 7 | 222600 | 226000 | F1 + F2 |
| 8 | 254400 | 259000 | F1 + F4 |
| 9 | 286200 | 286000 | F2 + F5 |
| 10 | 318000 | 317000 | F1 + F2 + F3 |
| 11 | 349800 | 350000 | F1 + F3 + F4 |
| 12 | 381600 | 377000 | F2 + F3 + F5 |
| 13 | 413400 | 410000 | F3 + F4 + F5 |
| 14 | 445200 | 441000 | F1 + F4 + F5 |
| 15 | 477000 | 499000 | F1 + F2 + F3 + F5 |
| 16 | 508800 | 514000 | F2 + F3 + F4 + F5 |
| 17 | 540600 | 545000 | F1 + F2 + F4 + F5 |

TABLE 7-continued

Selected System Capacities and Compressor Stage Information

| Max Discrete Stage Nos. | Target Capacity | Selected/ Revised Available Capacity | Compressor Stage Driving Information |
|---|---|---|---|
| 18 | 572400 | 545000 | F1 + F2 + F4 + F5 |
| 19 | 604200 | 636000 | F1 + F2 + F3 + F4 + F5 |
| 20 | 636000 | 636000 | F1 + F2 + F3 + F4 + F5 |

The HVAC system may be limited to operating in a linear or substantially linear range of available capacities. With reference to the stated example, the application in which the HVAC system is implemented may be such that the target capacity is most or all of the time greater than or equal to the capacities of stage 3 (e.g., 95400 BTUs) or stage 4 (e.g., 127200 BTUs). As a result, the HVAC system is operated in a linear or substantially linear range of the available capacities.

Table 7 also provides some compressor stage information for each stage. The provided compressor stage information is provided in column 4 and indicates which ones of the compressors are in an active state and supporting some of the capacity for that stage. The system capacities of the stages may be set to minimize power cycling of the variable speed compressor.

In an embodiment and at 222A, the configuration inputs 156 indicate that the available system capacity profile being generated is non-linear. The system capacities being selected for the available system capacity profile may match the target system capacities providing non-linearity. If the non-linearity is for a portion of the revised available system capacity profile, then the remainder of the revised available system capacity profile may be linear and/or closely match a linear portion of the target system capacity profile.

In one embodiment and at 222A, if multiple capacity possibilities exist for a same capacity operating point/stage, the capacity possibilities may be stored together and used for run-time balancing of compressors. To maximize individual compressor life, run-time balancing may be performed during the method of FIG. 9. During run-time balancing, the stage profiler 140 and/or the control module 138 monitors operating time (or hours) of the compressors and when a stage is selected for which one of multiple compressors may be selected to provide all or a portion of the corresponding capacity for that stage, the compressor having the least amount of run-time is selected.

In another embodiment, the capacities may be selected and/or ordered according to a lead-lag strategy to activate certain compressors prior to activating other compressors. As an example, in a cooling data center application, variable speed compressors may be activated and used to support a target capacity prior to activating fixed capacity compressors and/or dual-capacity compressors.

At 222B, the stage profiler 140 determines in one embodiment whether a variable speed compressor is included in one of the compressor circuits. If one of the compressor circuits includes a variable speed compressor, operation 222C is performed, otherwise operation 222C is skipped.

At 222C, the variable speed module 170 performs a fine tuning process that includes adjusting (or fine tuning) selected system capacities associated with one or more variable speed compressors to match or more closely match corresponding capacities of the target system capacity profile. In an embodiment, the frequencies are adjusted to minimize a difference between the target capacities and the revised available capacities. Frequencies of voltage signals provided to the motors of the variable speed compressors corresponding to the selected capacities may be adjusted to adjust the corresponding speeds of the motors/compressors and provide the adjusted capacities. The fine-tuned capacities may be calculated based on the corresponding fine-tuned frequencies. The fine tuning process may be performed to improve linearity of the revised available system capacity profile associated with the revised capacities selected at 222A and/or provide a fine tuned available system capacity profile that is linear. The fine tuning process may include generating and populating tables 8-10 and/or similar tables including accessing and/or determining revised (or original) capacities, fine-tuned capacities, original frequencies and/or fine-tuned frequencies provided in the tables. As shown in table 10, the fine-tuned capacities may be equal to the corresponding target capacities, such that the differences between the fine-tuned capacities and the target capacities are zero resulting in a linear capacity profile.

Table 8 shows example frequencies and corresponding capacities of a variable speed compressor limited to 10 stages. Table 9 shows capacities for system stages and corresponding frequencies of the variable speed compressor. Table 10 shows original available capacities, fine-tuned capacities, original frequencies of the variable speed compressor, and fine-tuned frequencies of the variable speed compressor. The variable speed compressor when operating at the original frequencies provides the original capacities. The examples of tables 8-10 are for the compressor arrangement associated with the example target system capacity profile 260 of FIG. 8 in which two compressor circuits each having a tandem set of compressors, where the first tandem set includes a variable speed compressor and a fixed capacity compressor and the second tandem set of compressors includes two fixed capacity compressors. The example of tables 8-10 are for a variable speed compressor operating in a frequency range of 35 Hertz (Hz) to 75 Hz, where the nominal operating frequency is 60 Hz. The frequency range of 35-60 Hz is divided into 10 equal steps as shown in Table 8.

TABLE 8

Variable Speed Compressor Frequencies and Capacities

| Stage No. | Frequency of Variable Speed Compressor (Hz) | Capacity (BTUs) |
|---|---|---|
| A0 | 35 | 851566.7 |
| A1 | 37.778 | 91926.47 |
| A2 | 40.556 | 98686.27 |
| A3 | 43.334 | 105446.1 |
| A4 | 46.112 | 112205.9 |
| A5 | 48.89 | 118965.7 |
| A6 | 51.668 | 125725.5 |
| A7 | 54.446 | 132485.3 |
| A8 | 57.224 | 139245.1 |
| A9 | 60.002 | 146004.9 |

TABLE 9

System Stage Capacities and Variable Speed Compressor Frequencies

| Stage No. | Target Capacity (BTUs) | Available Capacity (BTUs) | Active Compressors | Frequency of Variable Speed Compressor (Hz) |
|---|---|---|---|---|
| 1 | 22750 | 83000 | C | 0 |
| 2 | 45500 | 83000 | C | 0 |
| 3 | 68250 | 83000 | C | 0 |
| 4 | 91000 | 91926 | A1 | 37.778 |
| 5 | 113750 | 112206 | A4 | 46.112 |
| 6 | 136500 | 139245 | A8 | 57.224 |
| 7 | 159250 | 168167 | A0 + C | 35 |
| 8 | 182000 | 181686 | A2 + C | 40.556 |
| 9 | 204750 | 202686 | A2 + B | 40.556 |
| 10 | 227500 | 227446 | A3 + D | 43.334 |
| 11 | 250250 | 250005 | A9 + B | 60.002 |
| 12 | 273000 | 272167 | A0 + B + C | 35 |
| 13 | 295750 | 296926 | A1 + C + D | 37.778 |
| 14 | 318500 | 317926 | A1 + B + D | 37.778 |
| 15 | 341250 | 344245 | A8 + C + D | 57.224 |
| 16 | 364000 | 365245 | A8 + B + D | 57.224 |
| 17 | 386750 | 394167 | A0 + B + C + D | 35 |
| 18 | 409500 | 407686 | A2 + B + C + D | 37.778 |
| 19 | 432250 | 434725 | A6 + B + C + D | 51.668 |
| 20 | 455000 | 455005 | A9 + B + C + D | 60.002 |

TABLE 10

System Stage Capacities and Variable Speed Compressor Frequencies Before and After Fine Tuning

| Stage No. | Target Capacity (BTUs) | Original Available Capacity (BTUs) | Fine-Tuned Available Capacity (BTUs) | Active Compressors | Original Frequency of Variable speed Compressor (Hz) | Fine-Tuned Frequency of Variable speed Compressor (Hz) |
|---|---|---|---|---|---|---|
| 1 | 22750 | 83000 | 83000 | C | 0 | 0 |
| 2 | 45500 | 83000 | 83000 | C | 0 | 0 |
| 3 | 68250 | 83000 | 83000 | C | 0 | 0 |
| 4 | 91000 | 91926 | 91000 | A1 | 37.778 | 37.397452 |
| 5 | 113750 | 112206 | 113750 | A4 | 46.112 | 46.746521 |
| 6 | 136500 | 139245 | 136500 | A8 | 57.224 | 56.095918 |
| 7 | 159250 | 168167 | 159250 | A0 + C | 35 | 35 |
| 8 | 182000 | 181686 | 182000 | A2 + C | 40.556 | 40.685041 |
| 9 | 204750 | 202686 | 204750 | A2 + B | 40.556 | 41.404219 |
| 10 | 227500 | 227446 | 227500 | A3 + D | 43.334 | 43.356192 |
| 11 | 250250 | 250005 | 250250 | A9 + B | 60.002 | 60.102685 |
| 12 | 273000 | 272167 | 273000 | A0 + B + C | 35 | 35.342329 |
| 13 | 295750 | 296926 | 295750 | A1 + C + D | 37.778 | 37.294712 |
| 14 | 318500 | 317926 | 318500 | A1 + B + D | 37.778 | 38.01389 |
| 15 | 341250 | 344245 | 341250 | A8 + C + D | 57.224 | 55.993178 |
| 16 | 364000 | 365245 | 364000 | A8 + B + D | 57.224 | 56.712356 |
| 17 | 386750 | 394167 | 386750 | A0 + B + C + D | 35 | 35 |
| 18 | 409500 | 407686 | 409500 | A2 + B + C + D | 40.556 | 41.301479 |
| 19 | 432250 | 434725 | 432250 | A6 + B + C + D | 51.668 | 50.650877 |
| 20 | 455000 | 455005 | 455000 | A9 + B + C + D | 60.002 | 59.999945 |

At 224, the available capacity profile module 168 and/or the variable speed module 170 stores the selected/revised system capacities as the available profile data 182 and/or the fine-tuned system capacities as the fine-tuned profile data 184 in the memory 134. In an embodiment, the capacities are stored as a table and/or as a plot. An example revised available system capacity profile 252 is shown in FIG. 7. The revised available system capacity profile 252 does not include capacities that have been fine-tuned during operation 222C.

As another example, a revised available system capacity profile 262 and a fine-tuned available system capacity profile 264 are shown in FIG. 8. The revised available system capacity profile 262 does not include capacities that have been fine-tuned during operation 222C. The fine-tuned available system capacity profile 264 does include capacities that have been fine-tuned during operation 222C. The fine-tuned available system capacity profile 264 more closely matches the target system capacity profile than the revised available system capacity profile 262.

The available system capacity profiles provide a basis upon which a modulation strategy can be followed for the compressors of the corresponding compressor arrangement and can be provided to the second controller (or compressor drive) 136, as described with respect to the method of FIG. 9. Subsequent to operation 224, the method may end at 226 as shown or may return to operation 202 if, for example, a change has been made in the compressor arrangement and/or one of the compressors has been changed with a compressor of a different type and/or capacity. The method may end at 226.

FIG. 9 shows an example method for operating an HVAC system (e.g., the HVAC system 100 of FIG. 4. This method may be performed by the output module 172 of the stage profiler 140 and subsequent to and/or while performing the method of FIG. 6. The operations of the method of FIG. 9 may be iteratively performed. The method may begin at 300. At 302, the load request signal 158 may be received and/or generated by the control module 138. The load request signal 158 may then be received by the output module 172 of the stage profiler 140.

At 304, the output module 172 may determine the compressor arrangement. This may include the number of compressor circuits, the number of compressors per compressor circuit, the types of the compressors, capacities of each compressor, and/or other configuration information. In one embodiment, this operation is skipped and operation 306 is performed subsequent to operation 302.

At 306, the output module 172 may access or receive available system capacity profile generated during the method of FIG. 6, which may be stored in the memory 134. The available system capacity profile may be selected based on the compressor arrangement and may be a default, revised, or fine-tuned available system capacity profile. The available system capacity profile provides a basis upon which a modulation strategy can be followed by the second controller (or compressor drive) 136.

At 308, the output module 172 selects a stage based on the load requested in the load request signal and the available system capacity profile. The available system capacity profile may be indicated by the available profile data 182 and/or the fine-tuned profile data 184. At 310, the output module 172 determines compressor modulation information based on the stage selected. The selected stage has associated capacities of corresponding active compressors and/or frequencies of variable speed compressors. The modulation information may indicate: the compressors to be in an active state (i.e. operating at a speed greater than 0); capacities, speeds, voltages and/or frequencies of the active compressors; timing of activation and/or deactivation of the compressors; and/or other modulation information.

At 312, the output module 172 sends the modulation information to the second controller (or compressor drive) 136. At 314, the second controller (or compressor drive) 136 controls and/or drives the compressors of the compressor circuits based on the modulation information. Operation 314 may include performing run-time balancing as described above. Operation 314 may also include performing lead-lag activation according to the lead-lag strategy, which may be defined by the available system capacity profile. Operation 302 may be performed subsequent to operation 314.

The above-described tasks of FIGS. 8-9 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The above-described stage profiling methods provide defined compressor modulation strategies. Stages are provided which may be sequenced through when increasing or decreasing system capacity. The disclosed systems and methods are applicable to multiple compressor circuit arrangements including tandem, Trio, and other configurations while providing linear and non-linear profiles. The systems and methods are applicable to compressors of various types and are not specific to a particular compressor arrangement and/or type.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The invention claimed is:

1. A system comprising:
   a first controller configured to execute first instructions to configure a stage profiler and execute second instructions of the stage profiler to control operation of at least one compressor circuit including one or more compressors; and
   a non-transitory computer-readable medium configured to store the first instructions and the second instructions,
   wherein the first instructions include
      receiving configuration inputs from a user interface to configure the stage profiler for the at least one compressor circuit,
      based on the configuration inputs, generating a target system capacity profile for the at least one compressor circuit and storing the target system capacity profile in the non-transitory computer-readable medium, the target system capacity profile is a series of possible system stage capacities for stages of the at least one compressor circuit,
      based on the target system capacity profile and a set number of stages, determining system stage capacities for the set number of stages of the at least one compressor circuit, and
      selecting some of the system stage capacities based on the target system capacity profile to generate an available system capacity profile, and
   wherein the second instructions include
      generating modulation information based on the available system capacity profile and a load request signal, and
      controlling operation of the one or more compressors based on the modulation information and according to the available system capacity profile.

2. The system of claim 1, wherein:
   the at least one compressor circuit comprises only one compressor circuit; and
   the one or more compressors includes only a variable speed compressor or a digital compressor.

3. The system of claim 1, wherein:
   the at least one compressor circuit comprises only one compressor circuit;
   the one or more compressors includes a plurality of compressors; and
   the second instructions include controlling operation of the plurality of compressors based on the modulation information and according to the available system capacity profile.

4. The system of claim 1, wherein:
   the at least one compressor circuit comprises a first compressor circuit and a second compressor circuit;
   the first compressor circuit includes first compressors;
   the second compressor circuit includes second compressors; and
   the second instructions include controlling operation of the first compressors and the second compressors based on the modulation information and according to the available system capacity profile.

5. The system of claim 4, wherein the first instructions include:
   determining the target system capacity profile for the first compressor circuit and the second compressor circuit;

determining the system stage capacities for stages of the first compressor circuit and the second compressor circuit, wherein the set number of stages include the stages of the first compressor circuit and the second compressor circuit; and transmitting the modulation information to a second controller to control the first compressors and the second compressors according to the available system capacity profile.

6. The system of claim 5, wherein the first instructions further include:
determining a system total capacity for the at least one compressor circuit; and
determining capacities for the set number of stages based on the system total capacity to provide the target system capacity profile.

7. The system of claim 5, wherein the first instructions further include:
determining a number of stages possible for each of the first compressor circuit and the second compressor circuit;
determining the set number of stages based on the number of stages possible for the first compressor circuit and the number of stages possible for the second compressor circuit;
determining compressor stage capacities for each of the first compressor circuit and the second compressor circuit; and
determining the system stage capacities for each of the number of system stages based on the set number of stages and the compressor stage capacities.

8. The system of claim 7, wherein:
the first instructions further include limiting a number of stages available for one of the first compressors or the second compressors; and
the one of the first compressors or the second compressors is at least one of a variable speed compressor or digital compressor.

9. The system of claim 5, wherein the first instructions further include, if one of the first compressors or one of the second compressors is a variable speed compressor, updating the available system capacity profile including at least one of:
fine tuning one or more of the determined system stage capacities; or
fine tuning one or more frequencies of one of the first compressors or one or more frequencies of one of the second compressors.

10. The system of claim 5, wherein the target system capacity profile is linear.

11. The system of claim 5, wherein:
the system stage capacities for the stages of the first compressor circuit and the second compressor circuit provide a non-linear profile; and
the available system capacity profile is linear.

12. The system of claim 5, wherein the first instructions further include:
receiving a configuration input (i) indicating that the target system capacity profile is non-linear, and (ii) one or more system capacities and corresponding stages; and
selecting some of the system stage capacities for the available system capacity profile based on the one or more system capacities and corresponding stages.

13. The system of claim 5, wherein the second instructions further include:

receiving the modulation information at the second controller; and
controlling the first compressors and the second compressors based on the available system capacity profile while performing run-time balancing of the first compressors and the second compressors.

14. The system of claim 5, wherein the second instructions further include:
receiving the modulation information at the second controller; and
driving the first compressors and the second compressors based on the available system capacity profile and according to a lead-lag strategy of operating the first compressors and the second compressors.

15. The system of claim 1, wherein the configuration inputs comprise:
a number of compressor circuits in the system;
a number of compressors in each of the compressor circuits in the system;
a type of each of the compressors in each of the compressor circuits in the system; and
capacities of each of the compressors in each of the compressor circuits in the system.

16. The system of claim 1, wherein the first instructions of the stage profiler further include:
determining a total system capacity; and
fitting a linear curve to a system capacity range having the total system capacity as a maximum capacity of the system capacity range to generate the target system capacity profile.

17. The system of claim 1, wherein the available system capacity profile is a linear portion of the target system capacity profile.

18. The system of claim 1, wherein the modulation information is not directly generated based on the target system capacity profile.

19. The system of claim 1, wherein the first controller is configured to, prior to controlling the one or more compressors, determine the system stage capacities for the set number of stages of the at least one compressor circuit.

20. The system of claim 1, wherein:
the one or more compressors comprise a plurality of compressors; and
the first controller is configured to execute the first instructions to
determine the series of possible system stage capacities for the plurality of compressors,
determine a system capacity range based on the series of possible system stage capacities of the plurality of compressors, and
fitting a linear curve to the system capacity range to provide the target system capacity profile.

21. The system of claim 20, wherein the first controller is configured to execute the first instructions to divide the system capacity range into equally spaced points providing the series of possible system stage capacities.

22. The system of claim 1, wherein:
the non-transitory computer-readable medium is configured to store instructions of the stage profiler for generating capacity stage profiles for different heating, ventilation and air-conditioning (HVAC) systems having different arrangements respectively of a plurality of compressor circuits;
the plurality of compressor circuits comprises the at least one compressor circuit; and
the first instructions of the stage profiler configured to provide at least one of i) a different target system capacity profile for each of the plurality of compressor circuits, or ii) a different available system capacity profile for each of the plurality of compressor circuits.

23. The system of claim 22, wherein the first controller executes the first instructions to provide a different target system capacity profile for each of the plurality of compressor circuits.

24. The system of claim 22, wherein the first controller executes the first instructions to provide a different available system capacity profile for each of the plurality of compressor circuits.

25. The system of claim 1, wherein:
the at least one compressor circuit comprises a first compressor circuit and a second compressor circuit;
the configuration inputs are a first set of configuration inputs for the first compressor circuit;
the first instructions further comprise
  receiving a second set of configuration inputs for the second compressor circuit, and
  reconfiguring the stage profiler for the second compressor circuit based on the second set of configuration inputs; and
the second compressor circuit is different than the first compressor circuit.

26. The system of claim 1, wherein:
the configuration inputs are a first set of configuration inputs for the at least one compressor circuit having a first compressor and a second compressor;
the one or more compressors comprise the first compressor and the second compressor; and
the first instructions further comprise
  subsequent to replacement of the second compressor with a third compressor, receiving a second set of configuration inputs for the at least one compressor circuit comprising the first compressor and the third compressor, the third compressor replacing the second compressor, and
  reconfiguring the stage profiler for the at least one compressor circuit based on the second set of configuration inputs.

27. The system of claim 1, wherein the user interface is connected to the first controller.

28. A method of operating at least one compressor circuit, wherein the at least one compressor circuit comprises one or more compressors, the method comprising:
  receiving configuration inputs from a user interface to configure a stage profiler for the at least one compressor circuit;
  based on the configuration inputs, generating a target system capacity profile for the at least one compressor circuit, the target system capacity profile is a series of possible capacities for stages of the at least one compressor circuit;
  storing the target system capacity profile in a non-transitory computer-readable medium;
  based on the target system capacity profile and a set number of stages, determining system stage capacities for the set number of stages of the at least one compressor circuit;
  selecting some of the system stage capacities based on the target system capacity profile to generate an available system capacity profile; and
  executing instructions of the stage profiler to control operation of the at least one compressor circuit including
    generating modulation information based on the available system capacity profile and a load request signal, and
    based on the modulation information, controlling the one or more compressors according to the available system capacity profile.

29. The method of claim 28, wherein:
the at least one compressor circuit comprises only one compressor circuit; and
the one or more compressors includes only a variable speed compressor or a digital compressor.

30. The method of claim 28, wherein:
the at least one compressor circuit comprises only one compressor circuit;
the one or more compressors includes a plurality of compressors; and
the plurality of compressors are controlled based on the modulation information and according to the available system capacity profile.

31. The method of claim 28, wherein:
the at least one compressor circuit comprises a first compressor circuit and a second compressor circuit;
the first compressor circuit includes first compressors;
the second compressor circuit includes second compressors; and
the first compressors and the second compressors are controlled based on the modulation information and according to the available system capacity profile.

32. The method of claim 31, further comprising:
determining the target system capacity profile for the first compressor circuit and the second compressor circuit;
determining system stage capacities for stages of the first compressor circuit and the second compressor circuit, wherein the set number of stages include the stages of the first compressor circuit and the second compressor circuit; and
based on the modulation information, driving the first compressors and the second compressors according to the available system capacity profile.

33. The method of claim 31, further comprising:
determining a system total capacity for the at least one compressor circuit; and
determining capacities for the set number of stages based on the system total capacity to provide the target system capacity profile.

34. The method of claim 31, further comprising:
determining a number of stages possible for each of the first compressor circuit and the second compressor circuit;
determining the set number of stages based on the number of stages possible for the first compressor circuit and the number of stages possible for the second compressor circuit;
determining compressor stage capacities for each of the first compressor circuit and the second compressor circuit; and
determining the system stage capacities for each of the number of system stages based on the set number of stages and the compressor stage capacities.

35. The method of claim 34, further comprising limiting a number of stages available for the available system capacity profile.

36. The method of claim 31, further comprising, if one of the first compressors or one of the second compressors is a variable speed compressor, updating the available system capacity profile including at least one of:

fine tuning one or more of the determined system stage capacities; or fine tuning one or more frequencies of one of the first compressors or one or more frequencies of one of the second compressors.

37. The method of claim 28, wherein the configuration inputs comprise:
- a number of compressor circuits;
- a number of compressors in each of the compressor circuits;
- a type of each of the compressors in each of the compressor circuits; and
- capacities of each of the compressors in each of the compressor circuits.

* * * * *